United States Patent
Jeon et al.

(10) Patent No.: US 10,705,813 B2
(45) Date of Patent: Jul. 7, 2020

(54) TECHNIQUE FOR DYNAMICALLY CONTROLLING PROCESSING DEVICES IN ACCORDANCE WITH CHARACTERISTIC OF USER APPLICATION

(71) Applicant: Samsung Electronics Co., Ltd., Gyeonggi-do (KR)

(72) Inventors: Cheol-Yong Jeon, Seoul (KR); Ji-Joong Moon, Seoul (KR); Gao Yi, Gyeonggi-do (KR); Yuan Wu, Gyeonggi-do (KR); Ra-Kie Kim, Gyeonggi-do (KR); Banger Ravishekhar, Gyeonggi-do (KR); Yong-Seok Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/755,419

(22) PCT Filed: Aug. 26, 2016

(86) PCT No.: PCT/KR2016/009502
§ 371 (c)(1),
(2) Date: Feb. 26, 2018

(87) PCT Pub. No.: WO2017/034364
PCT Pub. Date: Mar. 2, 2017

(65) Prior Publication Data
US 2018/0253291 A1 Sep. 6, 2018

(30) Foreign Application Priority Data
Aug. 26, 2015 (KR) .................. 10-2015-0120484

(51) Int. Cl.
*G06F 8/41* (2018.01)
*G06F 9/50* (2006.01)

(52) U.S. Cl.
CPC ............... *G06F 8/47* (2013.01); *G06F 8/423* (2013.01); *G06F 8/433* (2013.01); *G06F 8/434* (2013.01); *G06F 8/44* (2013.01); *G06F 9/5027* (2013.01)

(58) Field of Classification Search
CPC ... G06F 8/44; G06F 8/47; G06F 8/423; G06F 8/433; G06F 8/434; G06F 9/5027; G06F 9/502
(Continued)

(56) References Cited

U.S. PATENT DOCUMENTS 7,039,908 B2 5/2006 Steensgaard
9,513,967 B2 * 12/2016 Dube .................... G06F 9/5011
(Continued)

FOREIGN PATENT DOCUMENTS

| KR | 1020130003836 | 1/2013 |
| KR | 1020130021172 | 3/2013 |
| KR | 1020160018030 | 2/2016 |

OTHER PUBLICATIONS

PCT/ISA/210 Search Report issued on PCT/KR2016/009502 (pp. 3).
PCT/ISA/237 Written Opinion issued on PCT/KR2016/009502 (pp. 7).

*Primary Examiner* — Marina Lee
(74) *Attorney, Agent, or Firm* — The Farrell Law Firm, P.C.

(57) ABSTRACT

Disclosed is a method by which a terminal device executes an application by using at least one calculating device, the method comprising the steps of: calculating a processing time of the at least one calculating device; selecting the predetermined number of processing devices for executing the application on the basis of a user's preference or the at least one calculated processing time; determining a workload for minimizing a processing time function determined
(Continued)

by using a use rate corresponding to the predetermined number of determined processing devices; and executing the application by applying the determined workload to the predetermined number of processing devices.

20 Claims, 8 Drawing Sheets

(58) Field of Classification Search
USPC .................................................. 717/100–167
See application file for complete search history.

(56) References Cited

U.S. PATENT DOCUMENTS

| | | | | |
|---|---|---|---|---|
| 9,715,408 | B2* | 7/2017 | Dube | G06F 9/5011 |
| 10,025,624 | B2* | 7/2018 | Bishop | G06F 11/3452 |
| 2006/0143291 | A1* | 6/2006 | Hayamatsu | G06F 9/50 |
| | | | | 709/224 |
| 2008/0072231 | A1* | 3/2008 | Yoshida | G06F 9/50 |
| | | | | 718/104 |
| 2008/0155551 | A1* | 6/2008 | Yoshida | G06F 9/50 |
| | | | | 718/104 |
| 2009/0179903 | A1* | 7/2009 | Lee | G06F 1/3203 |
| | | | | 345/503 |
| 2010/0180278 | A1* | 7/2010 | Yoshida | G06F 9/505 |
| | | | | 718/103 |
| 2011/0191773 | A1* | 8/2011 | Pavel | G06Q 50/06 |
| | | | | 718/100 |
| 2012/0192200 | A1 | 7/2012 | Rao et al. | |
| 2013/0050229 | A1* | 2/2013 | Song | G06F 7/504 |
| | | | | 345/502 |
| 2013/0117596 | A1* | 5/2013 | Furukawa | G06F 11/3409 |
| | | | | 713/340 |
| 2014/0156735 | A1* | 6/2014 | Yamasaki | H04L 69/28 |
| | | | | 709/203 |
| 2014/0165077 | A1 | 6/2014 | Martinez Canedo et al. | |
| 2014/0237457 | A1* | 8/2014 | Munshi | G06F 9/4843 |
| | | | | 717/140 |
| 2014/0281613 | A1* | 9/2014 | Kaito | G06F 1/324 |
| | | | | 713/322 |
| 2014/0282588 | A1* | 9/2014 | Suzuki | G06F 9/5044 |
| | | | | 718/104 |
| 2015/0199787 | A1 | 7/2015 | Pechanec et al. | |
| 2016/0041845 | A1 | 2/2016 | Yoon et al. | |
| 2016/0210170 | A1* | 7/2016 | Scheuer | G06F 11/3476 |
| 2017/0070516 | A1* | 3/2017 | Kang | G06Q 50/06 |
| 2017/0286177 | A1* | 10/2017 | Bishop | G06F 9/5083 |
| 2018/0253291 | A1* | 9/2018 | Jeon | G06F 8/423 |

* cited by examiner

DETERMINED IN ACCORDANCE WITH CACHE INPUT SIZE

| | CALCULATION TIME [ms] | |
|---|---|---|
| | 30K | 3000K |
| SERIAL | 9.1 | 399.1 |
| PARALLEL | 9.4 | 153 |
| SIMD | 10.01 | 522 |
| GPU | 189.9 | 1.547 |
| PARALLEL-SIMD | 9.4 | 150.1 |

TECHNIQUE FOR DYNAMICALLY CONTROLLING PROCESSING DEVICES IN ACCORDANCE WITH CHARACTERISTIC OF USER APPLICATION

PRIORITY

This application is a National Phase Entry of International Application No. PCT/KR2016/009502, filed on Aug. 26, 2016, and claims priority to Korean Patent Application No. 10-2015-0120484, filed Aug. 26, 2015, the content of each of which is incorporated herein by reference.

TECHNICAL FIELD

The present disclosure relates to a compiler module and a runtime module for efficiently executing applications on a terminal that uses various processing devices.

BACKGROUND ART

In order to operate user applications on a device such as a terminal, there is a need for a process of compiling application codes constructed by program languages and a process of executing compiled binaries (that is, execution codes).

Various processing devices (that is, HW modules) for executing binaries may be included in a terminal. A central processing unit (CPU) is representative of the processing devices. The terminal may include, other than a CPU, single instruction multiple data (SIMD), Parallel-SIMD, a graphic processing unit (GPU), a general purpose GPU (GPGPU), or a digital signal processor (DSP).

Attempts to effectively use various processing devices in terminals have been made only by application developers up to now. Applications that are operated on processing devices in terminals are developed using hardware (HW)-specified (that is, processing device-specified) application programmable interfaces (API) (for example, an OpenCL for a GPU). That is, the applications for processing devices are developed through languages other than languages (C/C++, Java, etc.) that are generally used. The HW-specified APIs sufficiently function as tools that enable corresponding applications to be operated on corresponding processing devices, but efficient use of the processing devices is actually implemented manually only by application developers.

Accordingly, developed applications are operated only in accordance with instructions (that is, scheduling) set by developers. In other words, in order to operate a specific code of an application on a specific processing device, an application developer has to construct the code in a language (for an API) for the processing device. Further, the developer has also to consider synchronization of processing devices.

DETAILED DESCRIPTION OF THE INVENTION

Technical Problem

The characteristics of an application necessarily totally depend on application developers. Further, developers cannot easily know the characteristics of applications that depend on the construction type of the developers, the state of using resources of processing devices when the applications are actually operated on the devices, or data sizes that the applications have to calculate, when the developers construct codes. Accordingly, applications have a limit in effectively using processing devices in terminals.

The present disclosure provides a method and device for enabling an application to efficiently use a processing device in a terminal by dynamically using characteristics of the application and state information (for example, availability rate and operation frequency) of the processing device in the terminal when the application is operated.

Further, the present disclosure provides a method and a device for analyzing code sections of an application, which can be executed on processing devices, and reducing complication in the analysis.

Technical Solution

There is provided a method of executing an application using at least one processing device in a terminal, the method including: calculating a processing time of the at least one processing device; selecting a predetermined number of processing devices to execute the application on the basis of user preference or the calculated at least processing times; determining workload minimizing a processing time function determined using utilization corresponding to the determined predetermined number of processing devices; and executing the application by applying the determined workload to the predetermined processing devices.

There is provided a terminal including a runtime module that executes an application using at least one processing device, in which the runtime module includes: a scheduler that calculates a processing time of the at least one processing device, determines a predetermined number of processing devices to execute the application on the basis of user preference or the calculated at least one processing time, determines workload minimizing a processing time function determined using utilization corresponding to the determined predetermined number of processing devices, and executes the application by applying the determined workload to the predetermined number of processing devices; and a device monitor that calculates the utilization information.

Advantageous Effects

The device according to the present disclosure effectively uses processing devices, so it can increase the operation speed of an application and reduce power consumption.

The device according to the present disclosure can improve the speed of analyzing a dependence relationship (fore example, pointers) of a source code of a compiler.

BRIEF DESCRIPTION OF DRAWINGS

The above and other aspects, features and advantages of the present disclosure will be more apparent from the following detailed description taken in conjunction with the accompanying drawings, in which.

MODE FOR CARRYING OUT THE INVENTION

Figure 1:
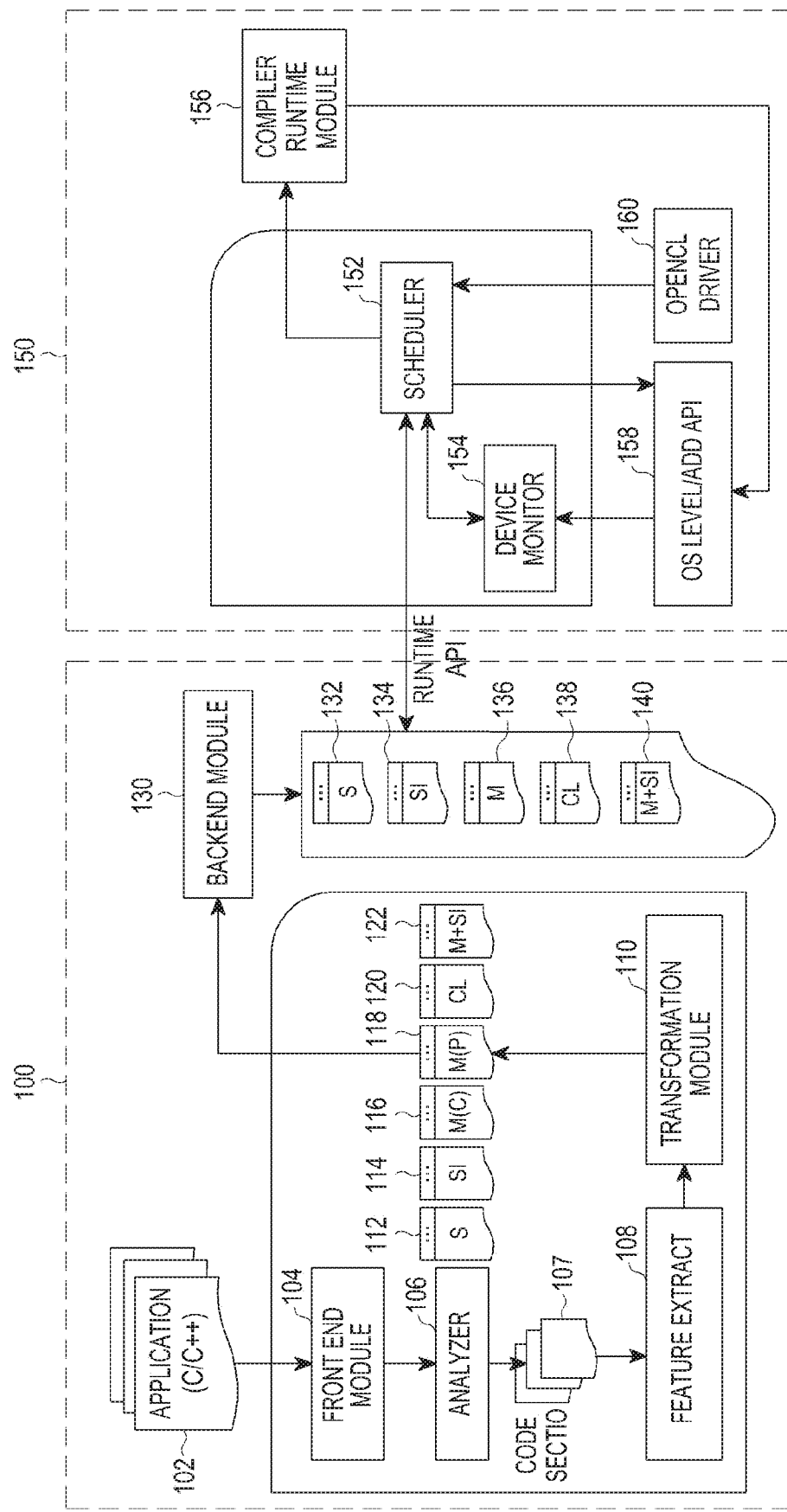
FIG. 1 is a view exemplifying the configuration of an application execution device according to the present disclosure.

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

In the detailed description of the present disclosure, an example of interpretable meanings of some terms used in the present disclosure is proposed. However, it is noted that the terms are not limited to the examples of the construable meanings which are proposed below.

A base station is a subject communicating with a User Equipment (UE), and may be referred to as a BS, a Node B (NB), an eNode B (eNB), an Access Point (AP) or the like.

The user equipment is a subject communicating with the BS, and may be referred to as a UE, a Mobile Station (MS), a Mobile Equipment (ME), a device, a terminal or the like. In the present disclosure, a device having at least one calculation device will be described as the user equipment.

The present disclosure proposes a technique that improves operational performance of an application by dynamically dividing a processing device(s) for calculating the application to maximally use available resources (processing device) of a terminal in accordance with calculation characteristics in terms of software (SW) of the application.

To this end, a complier part that makes it possible to produce an execution code so that software can be executed in other processing devices and a runtime SW part that makes it possible to operate an actual execution code in consideration of calculation characteristics an the state of a device are described in the present disclosure.

In terms of a device, the complier part can be implemented, for example, in a complier module and the runtime SW part can be implemented, for example, in a runtime module. The compiler module and the runtime module can be included in one device such as a user terminal or may be included in separate devices. For example, the compiler module can be implemented (mounted) in HW such as a terminal, but may be implemented in HW such as a desktop or a server. Further, the runtime module can be implemented (mounted) in HW such as a terminal to drive an application. A code complied by a compile module of a device such as a desktop or a server can be imported to a terminal including a runtime module and the compiled code can be executed by control of the runtime module or scheduling. Although a case in which a complier module and a runtime module are implemented in one device such as a terminal is exemplified hereafter, the scope of the present disclosure is not limited thereto and the modules may be implemented in separate devices.

FIG. 1 is a view exemplifying the configuration of an application execution device according to the present disclosure.

The application execution device according to the present disclosure may include at least one of two modules, that is, a compiler module 100 and a runtime module 150. The compiler module 100 and the runtime module 150 may be implemented in one module such as a controller.

The compiler module may have a compiler infrastructure such as LLVM(http://llvm.org/). The compiler module 100 receives an application source code 102 or a complier directive that is constructed by a language such as C or C++. The C/C++ compiler directive may be "#pragma omp parallel" that gives an instruction to a multicore CPU, "#pragma omp simd" that gives an instruction to a SIMD, or "#pragma omp target" that gives an instruction to a GPU.

Since the compiler module of the present disclosure receives the source code 102 or a directive constructed by a language such as C or C++, an application developer does not need to use a language or an API only for a specific processing device (that is, a language or an API specified for the processing device) to construct a source code.

The compiler module 100 may include a front end module 104. The front end module 104 changes the input source code 102 or directive into a code that the compiler module 100 can understand, that is, an intermediate code. The intermediate code may be referred to as an intermediate representation (IR).

The compiler module 100 may include an analyzer 106. The analyzer 106 can collect information about a code by analyzing the source code and create one or more code sections 107 that can be executed on separate processing devices from the source code. The code sections that can be executed on separate processing devices, for example, are code sections that are independent from other code sections. The compiler module 100 can use the collected information about a code to optimally create execution codes for various processing devices.

In particular, the analyzer 106 can analyze a dependence relationship using pointers that are used for C/C++ source codes. The compiler module 100 can analyze dependence of data when an application is operated, using the result of analyzing the pointers, and can create an optimized execution code by finding out the dependence of data. The pointers are also called aliasings.

The pointer analysis is work that analyzes data independence, so it has a large influence of the entire compiling time. An exemplary analyzing process by the analyzer 106 is described.

The analyzer 106 can analyze a source code and construct a constraint graph having N nodes, using variables and pointers used in the source code. N nodes of the constraint graph may have constraint types exemplified in Table 1.

TABLE 1

| Constraint type | Assignment | Constraint | Meaning |
| --- | --- | --- | --- |
| AddressOf (Base) | a = &b | a ⊇ {b} | loc(b) ∈ pts(a) |
| Copy (Simple) | a = b | a ⊇ b | pts(a) ⊇ pts(b) |

TABLE 1-continued

| Constraint type | Assignment | Constraint | Meaning |
|---|---|---|---|
| Load (Complex1) | a = *b | a ⊇ *b | ∀v∈pts(b) pts(a) ⊇ pts(v) |
| Store (Complex2) | *a = B | *a ⊇ b | ∀v∈pts(a) pts(v) ⊇ pts(b) |

Where "a=&b" means assigning a to the 'address' of the variable b, "a=b" means 'copy' that assigns the variable b to a, "a=*b" means 'load' that assigns the pointer b to a, and "*a=b" means 'store' that assigns b to the pointer a.

The analyzer 106 takes a calculation amount corresponding to about $O(N^3)$ to analyze the dependence relationships of N nodes. In order to reduce the calculation amount, the analyzer 106 according to the present disclosure can separately perform offline analysis and online analysis when analyzing the dependence relationships among pointers. The offline analysis is an analysis process that creates the constraint graph from a source code and the online analysis is an analysis process that finds out the actual relationships from the created constraint graph, and for example, Andersen's analysis may be applied.

In detail, in the offline analysis, the analyzer 106 can find out whether two nodes have a 'cycle relationship' and handle and analyze the two nodes corresponding to 'cycle nodes' as one node. The cycle nodes are two nodes connected like a chain and independent to other nodes except for the two nodes (that is, having a 'cycle relationship').

Further, the analyzer 106 can determine nodes, which satisfy the following exemplary conditions, other than the cycle nodes as 'independent nodes' and combine the nodes into one node. The first condition is that a predecessor is not added to the node a in online analysis. (For example, the top level point variable of LLVM IR may be a node to which a predecessor is not added in online analysis). The second condition is that the node a has only one predecessor node b in a created constraint graph in offline analysis. The third condition is that all points (point-to set) of the node a come from (only) the predecessor node b. The node a satisfying the three conditions can be handled as one node with the predecessor node b.

As described above, the analyzer 106 can reduce the calculation amount required for code analysis to about O(N) by combining nodes constituting a code, using dependence in code analysis.

Figure 2:
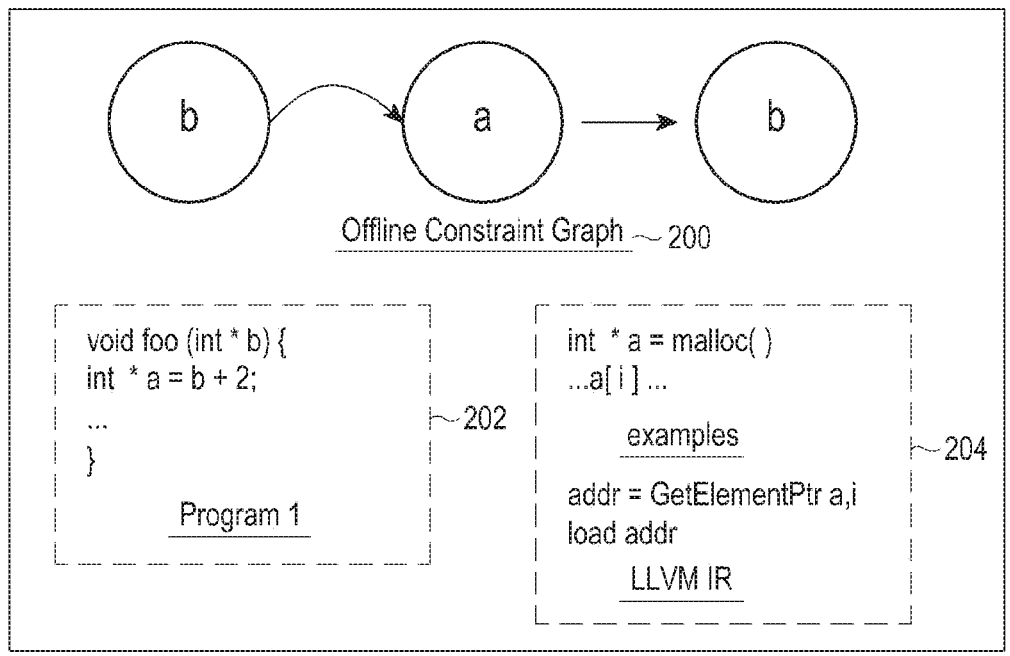
FIG. 2 is a view exemplifying a constraint graph, a source code, and an IR for describing conditions of nodes that a compiler module according to the present disclosure handles as one node.

FIG. 2 is a view exemplifying a constraint graph, a source code, and an IR for describing conditions of nodes that a compiler module according to the present disclosure handles as one node.

An offline constraint graph 200 of a node a and a node b that satisfy the three conditions, a code 202 and an IR 204 that are constructed by C language are exemplified in FIG. 2.

The compiler module 100 may include a feature extractor 108. The feature extractor 108 determines whether code sections can be operated in a specific processing device, using the analysis result by the analyzer 106, and extract code information from operable code sections to be used when the code sections are operated. Code information that is extracted by the feature extractor 108 is exemplified as follows.

TABLE 2

| Information | Contents |
|---|---|
| Information related to instructions in code section | Integer ALU (arithmetic logic unit): instruction to add up integers<br>Float: instruction to add up number of floating points<br>Multiply: instruction to multiply<br>Load/Store: instruction to load/store<br>Branch: instruction to branch<br>Vector Integer: integer array<br>Vector Float etc.: floating point array |
| Amount of data to be transmitted to cache | Input data amount |

When an instruction of a compiler designated by a developer is input together with the source code, the feature extractor 108 may determine a code section that can be operated in a specific processing device on the basis of the input instruction (that is, a guide).

The compiler module 100 may include a transformation module 110. The transformation module 110 can create a plurality of codes allowing for parallelization by a plurality of processing devices, so it is also called a parallelization module.

The transformation module 110 transforms the input source section into source codes suitable for processing devices, respectively, using the analysis result by the analyzer 106 or the information extracted by the feature extractor 108. That is, the transformation module 110 can determine how to transform a code using the analysis result or extracted information, and then transform the source section in consideration of the characteristics of the processing devices. FIG. 1 shows, as exemplary source codes suitable to processing devices, a source code 112 (Serial) for a single core, a source code 114 (SI) for a SIMD, a (classical) source code 116 (M(C)) for a multicore, a (polyhedral) source code 118 (M(P)) for a multicore, a source code 120 (CL) for a GPU, and a source code 122 (M+SI) for a multicore+SIMD.

In detail, the transformation module 110 can apply at least one of code transformation techniques such as loop tiling, unrolling, or an inter-leaving (that is, skewing), using the analysis result (that is, the extracted code information) when transforming the source code. Loop tiling means partitioning loop calculation into at least one unit block (tile). The transformation module 110 can determine the size of the tile in consideration of the cache of the compiler. Accordingly, it is possible to examine in advance the effect of tiling according to the cache size and reduce the ratio of cache miss. Unrolling means expounding loop calculation including conditional sentences (for example, sentences starting with 'if') into a set of instructions without a conditional sentence. Unrolling is performed because it may be more efficient to perform relatively long instructions without including loop calculation, as compared with a processing device performing loop calculation. Interleaving means changing (or distorting) a calculation structure of loop calculation, for example, by changing the locations of arguments included in the loop calculation.

The source code transformed by the transformation module 110 may include a data structure having a 'source characteristic'. Accordingly, the transformed source code may be called an 'annotated code'. In order that the runtime module 150 can use an appropriate source code when operating an application, the compiler module 100 constructs a data structure corresponding to the code characteristic and inserts the data structure into the source code so that the application can be actually accurately operated. The transformation module 110 uses a compiler runtime API of the runtime module 150 so that all transformed source codes can be controlled to operate by the runtime module regardless of the types of processing devices.

An example of a data structure of a code characteristic is as in the following table.

TABLE 3

| Code characteristic | Simultaneously used or not |
| --- | --- |
| | Binary to operate |
| | Number of threads |
| | Data range for each binary |

The compiler module 100 may include a backend module 130. The backend module 130 can create at least one execution code (that is, binary) 132, 134, 136, 138, and 140 by compiling at least one source code 112, 114, 116, 118, 120, and 122 suitable for processing devices, respectively.

Next, the runtime SW part of a terminal is described.

The runtime module 150 corresponding to the runtime SW part can execute an application by driving calculation corresponding to at least one execution code (that is, binary) 132, 134, 136, 138, and 140 on a processing device.

The runtime module 150 may include a scheduler 152. The scheduler 152 can use a device monitor 154 as a service of system software to check the state of processing devices (for example, utilization and frequency) before the execution code is executed on the processing devices, and can transmit/receive state information of the processing devices to/from the compiler runtime module 156 through an IPC (Inter Procedure Communication). The state information of the processing devices that is transmitted through the device monitor 154 is as in the following table.

TABLE 4

| State information of processing device | Utilization of processing device |
| --- | --- |
| | Operation frequency of processing device |
| | On-off state of processing device |

The scheduler 152 can collect static information and dynamic information and determine a combination of processing resources (that is, processing devices) to be operated, on the basis of the collected information in order to effectively use the processing devices. The scheduler 152 determines an efficient workload value (load division ratio) to be designated to the processing device(s) of the determined combination and drives the execution code on the processing device(s) in accordance with the determined workload. The static information and dynamic information can be divided into HW information and SW information related to a source code in accordance with the characteristics.

The scheduler 152 can obtain static information related to a source code through the feature extractor 108 of the compiler module 100 and can be provided in advance with static information related to the environment (that is, HW).

The dynamic information, which is parameters that are determined when a code is performed, may be utilization information and operation frequency information of processing devices that the scheduler 152 obtains through the device monitor 154.

Static information and dynamic information are exemplified in the following table.

TABLE 5

| | Static information | Dynamic information |
| --- | --- | --- |
| Related to source code | Number of total instructions in loop Scalar Operations)(int/float instruction count) Vector Operations)(int4/float4 instruction count) Loaded, stored on memory Data amount to be transmitted to cache * Preference of user (developer) | Repeated number of loop Data size to be processed Location of data (L1, L2, L3): L1 > L2 > L3 depending on intensity of proximity of CPU |
| Related to environment | Number & calculation ability of CPU cores Number & calculation ability of SIMDs Processor, dimension, memory size of GPGPU Calculation ability of accelerator * Memory bandwidth | Utilization, frequency information of each CPU core Utilization, frequency information of GPGPU Utilization, frequency information of DSP * Utilization, frequency information of accelerator |

The processing times of instructions are different in processing devices, so the scheduler 152 can extract information about calculation characteristics of processing devices and use the extracted information to determine a processing device to operate. The information about calculation characteristics of processing devices can be configured as in the types shown in the following table, using benchmarks for HW specifications or operations.

TABLE 6

| Calculation | CPU | GPGPU | DSP | Accelerator1 |
| --- | --- | --- | --- | --- |
| Inter ALU | $CPU_{int}$ | $GPGPU_{int}$ | $DSP_{int}$ | $ACC_{int}$ |
| Float | $CPU_{float}$ | $GPGPU_{float}$ | $DSP_{float}$ | $ACC_{float}$ |
| Multiply, MAC | $CPU_{Mul}$ | $GPGPU_{Mul}$ | $DSP_{Mul}$ | $ACC_{Mul}$ |
| Load/Store | $CPU_{mem}$ | $GPGPU_{mem}$ | $DSP_{mem}$ | $ACC_{mem}$ |
| Branch | $CPU_{br}$ | $GPGPU_{br}$ | $DSP_{br}$ | $ACC_{br}$ |
| Vector integer | $CPU_{vint}$ | $GPGPU_{vint}$ | $DSP_{vint}$ | $ACC_{vint}$ |
| Vector integer | $CPU_{vfloat}$ | $GPGPU_{vfloat}$ | $DSP_{vfloat}$ | $ACC_{vfloat}$ |
| ... | ... | ... | ... | ... |
| Total | $CPU_{total}$ | $GPGPU_{total}$ | $DSP_{total}$ | $ACC_{total}$ |

The scheduler 152 can select N processing devices to apply workload to, in order to operate an application on the basis of i) user preference or ii) priorities determined by performance estimation (for example, N=2). For example, when using user preference, the scheduler 152 can determine to use a processing device selected by the user. When using the performance estimation result, the scheduler 152 can estimate the performance of processing devices and determine a processing device to use. For example, the priorities determined in accordance with the performance estimation can be determined in order arranging in ascending power the total calculation times of the processing devices determined by Table 6 (that is, $CPU_{Total}$, $GPGPU_{Total}$, $DSP_{Total}$, $ACC_{Total}$). The priority of the processing device with the smallest total calculation time is the highest.

Equations that are used for the performance estimation of the processing devices in Table 6 are described.

total calculation time=calculation time+memory latency time+branch processing time+data copy overhead       [Equation 1]

The calculation time may include an integer calculation time and a vector calculation time. The memory latency time may include a memory read/write latency time and a vector load/store latency time. The data copy overhead, for example, may include time taken for data transfer.

In detail, time for which workload is performed in a specific processing device (that is, the device N) can be expressed as in the following equation.

$$T_{total}(device_N)=\Sigma(T_{op}+T_{vec\_op})+\Sigma(T_{mem\_lat}+T_{vec\_ld\_st\_lat})+\Sigma T_{br}+T_{data\_tr}*2 \quad \text{[Equation 2]}$$

Where $T_{total}(device_N)$ is the total calculation time of the device N, $T_{op}$ is a calculation (instruction) processing time, $T_{vec\_op}$ is a vector calculation processing time, $T_{mem\_lat}$ is a memory latency time, $T_{vec\_ld\_st\_lat}$ is a vector load/store latency time, $T_{br}$ is a branch processing time, and $T_{data\_tr}$ is a data transfer processing time.

Equation 2 can be expressed as the following equations by reflecting characteristics of processing resources.

$$T_{total}(\text{single cpu})=\Sigma T_{op}+\Sigma T_{mem\_lat}+\Sigma T_{br} \quad \text{[Equation 3]}$$

Equation 3 shows the total processing time when a processing device is a single core CPU. For the single core CPU, only calculation takes time and there is little overhead time $T_{data\_tr}$ due to data copy, so it can be considered as 0.

$$T_{total}(\text{multi }cpu) = \frac{\sum T_{op}}{Thread_{count}} + \sum T_{mem\_lat} + \frac{\sum T_{br}}{Thread_{count}} \quad \text{[Equation 4]}$$

Equation 4 shows the total processing time when a processing device is a multicore core CPU. $Thread_{count}$ is the number of threads of the CPU. The multicore CPU creates two or more threads and perform parallel calculation through the created threads, so the calculation time (and branch processing time) is reduced in proportion to the number of the threads. However, the threads of the multicore CPU simultaneously access a memory, so the memory latency time is not increased.

$$T_{total}(SIMD)=\Sigma(T_{op}+T_{vec\_op})+\Sigma(T_{mem\_lat}+T_{vec\_ld\_st\_lat})+\Sigma T_{br} \quad \text{[Equation 5]}$$

Equation 5 shows the total processing time when a processing device is a SIMD. The performance of the SIMD may depend on the size of a vector and a data type size and little data copy time is required.

$$T_{total}(GPGPU)=\Sigma(T_{op}+T_{vec\_op})+\Sigma(T_{mem\_lat}+T_{vec\_ld\_st\_lat})+\Sigma T_{br}+T_{data\_tr}*2 \quad \text{[Equation 6]}$$

Equation 6 shows the total processing time when a processing device is an accelerator such as a GPGPU or a DSP. The accelerator such as a GPU or a DSP has a data copy time. However, when a shared memory that can be used by a CPU and a GPU is supported, the data copy time $T_{data\_tr}$ may become 0.

The scheduler 152 can sequentially obtain the values $T_{total}(device_1)$, $T_{total}(device_2)$, $T_{total}(device_3)$, . . . , and $T_{total}(device_N)$ for N processing devices by calculating the processing times of other processing devices in the manner described above, and give priorities by arranging the obtained processing times in ascending power in accordance with performance (that is, the length of the processing times) (for example, $T_{total}(device_1)<T_{total}(device_3)<T_{total}(device_2)$).

The scheduler 152 scan select upper N devices corresponding to the determined priorities in consideration of input by user or predetermined setting and can apply the priorities to a load distribution optimization process of the selected N devices. Preferably, N may be 2.

In order to efficiently operate in real time the N selected processing devices, accurate performance estimation is required and the scheduler 152 can use real-time available information (that is, dynamic information) for performance estimation. The performance (that is, processing times) in Equations 1 to 6 is calculated under the assumption that the corresponding processing devices have been 100% used. However, the processing devices cannot be always 100% used. Accordingly, the scheduler 152 can more accurately estimate the performance by reflecting dynamic information such as the utilization information or frequency information of the processing devices.

When the workload is divided and assigned to processing devices, the operation speed of an application will be determined by the processing device having the longest time of the processing devices to which the workload has been assigned. The application processing time $T_{workload}$ determined on the basis of the processing time of the processing device having the longest time can be expressed as the following equation.

$$T_{workload} = \text{Max}\left(\alpha_1 \times \frac{T_{total}(device_1)}{(1-\beta_1)}, \alpha_2 \times \frac{T_{total}(device_2)}{(1-\beta_2)}, \alpha_3 \times \frac{T_{total}(device_3)}{(1-\beta_3)}, \ldots\right) \quad \text{[Equation 7]}$$

Where $\alpha$ is a load division ratio of the processing device determined by load distribution and $\alpha_1+\alpha_2+\alpha_3+=1$. $\beta$ is normalized utilization. It is assumed that $\beta$ is 0 when a processing device is in an idle state and has 1 when a processing device is fully used ($0<=\beta<1$).

Accordingly, the scheduler 152 can optimize load distribution for each processing device by determining the share ratio $\alpha$ that minimizes Equation 7 in consideration of real-time available information (that is, utilization) for each processing device. The optimum share ratio $\alpha$ can be determined by the following equation.

$$\text{Min}[T_{workload}] = \text{Min}\left[\text{Max}\left(\alpha_1 \times \frac{T_{total}(device_1)}{(1-\beta_1)}, \alpha_2 \times \frac{T_{total}(device_2)}{(1-\beta_2)}, \alpha_3 \times \frac{T_{total}(device_3)}{(1-\beta_3)}, \ldots\right)\right] \quad \text{[Equation 8]}$$

The runtime module 150 may include the compiler runtime module 156. The runtime compiler module 156 provides a compiler runtime library. The compiler runtime library enables the scheduler to drive execution codes (that is, binaries) 132, 134, 136, 138, and 140 of the application in close combination with the compiler module 100.

Selectively, the runtime module 150 may further includes an additional API module 158 at an OS (Operation System) level or an OpenCL driver module 160 for driving a GPU.

Figure 3:
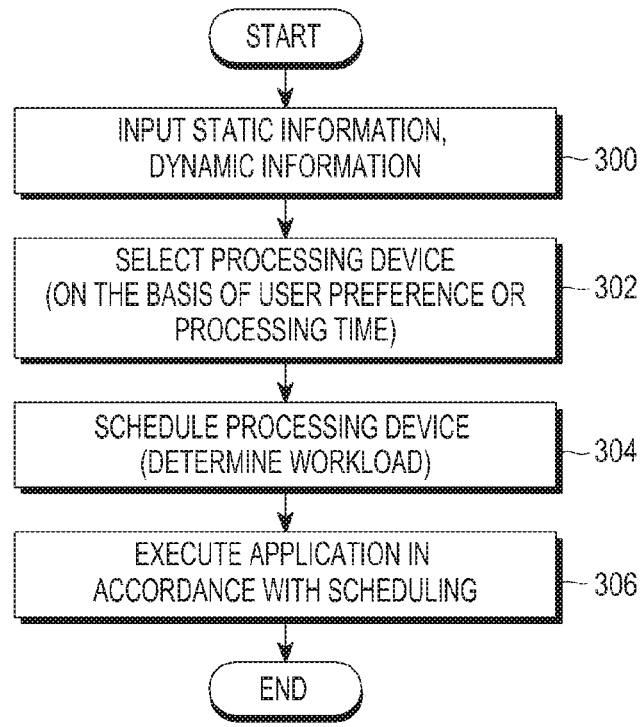
FIG. 3 is a view schematically illustrating the operation of a runtime module according to the present disclosure.

FIG. 3 is a view schematically illustrating the operation of a runtime module according to the present disclosure.

A runtime module (particularly, a scheduler) can receive static information corresponding to execution codes from the analyzer of the compiler and can receive static information from the device monitor (300).

The runtime module can perform an operation of selecting a processing device to executing an application (302). In detail, the runtime module can calculate performance (for example, a processing time) of each processing device. The runtime module can arrange the calculated performance of the processing device in ascending power. The runtime module may select N processing devices having higher priorities as devices for executing the application in consideration of selection by a user.

The runtime module can perform a scheduling operation of determining workload of the selected processing device (304). For example, the runtime module can determine an application processing time $T_{workload}$, using utilization or frequency information. The runtime module can determine workload $\alpha_1, \alpha_2, \alpha_3, \ldots$ minimizing $T_{workload}$.

The runtime module drives an application execution code by applying the determined workload to the processing devices, respectively (306).

FIG. 4 is a view exemplifying an effect when a processing device to be operated and workload are determined, in terms of source utilization and used energy in accordance with the present disclosure.

Figure 4A:
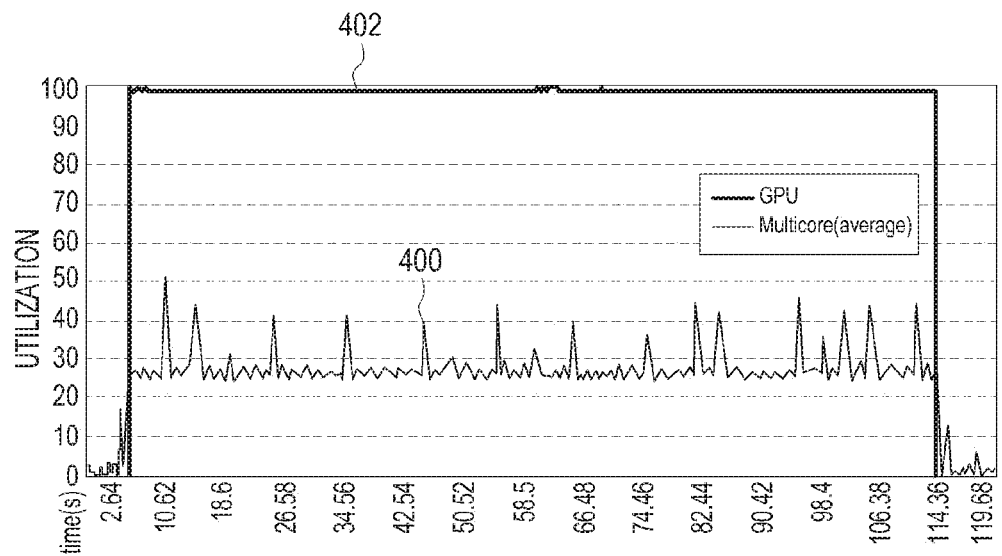
FIG. 4 is a view exemplifying an effect when a processing device to be operated and workload are determined, in terms of source utilization and used energy in accordance with the present disclosure.
Figure 4B:
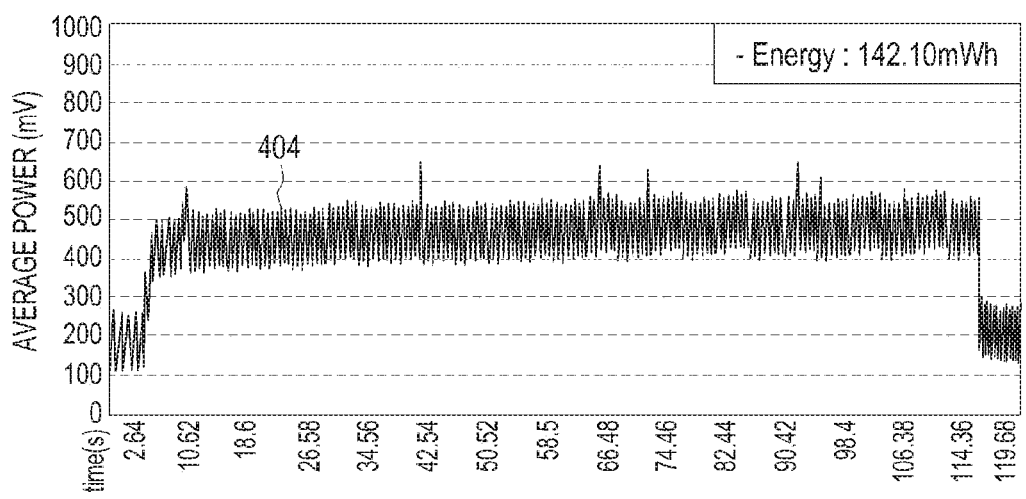
Figure 4C:
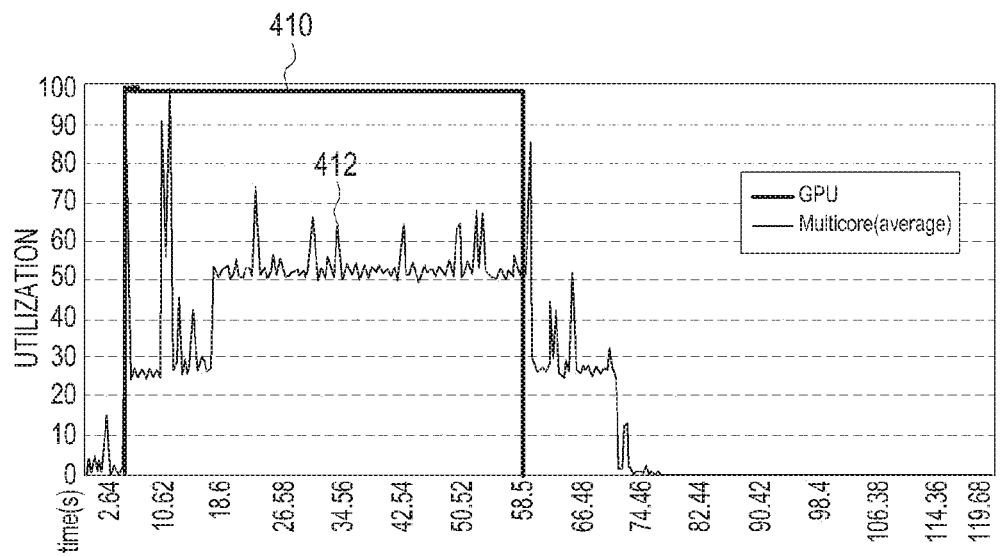
Figure 4D:
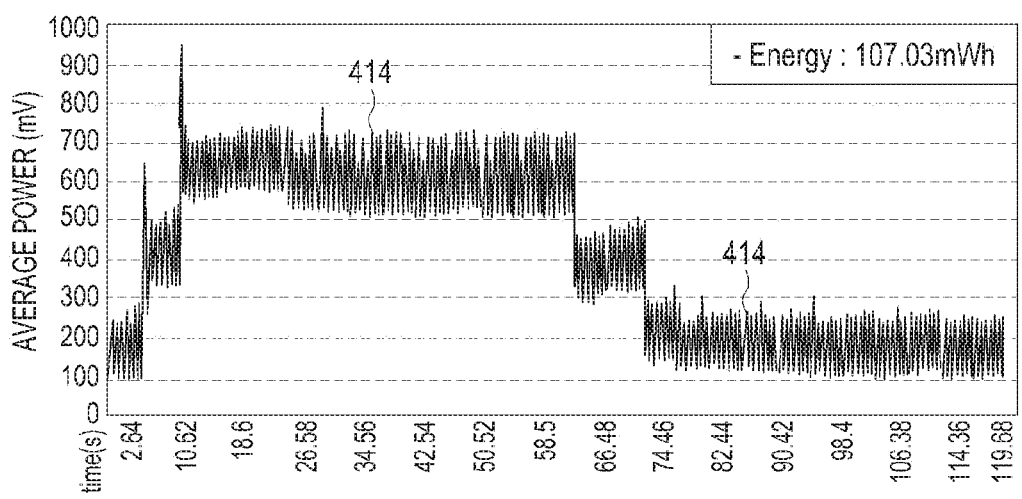

FIGS. 4(a) and 4(b) show results when an operation of selecting a runtime module and determining workload is not applied, and FIGS. 4(c) and 4(d) show results when an operation of selecting a runtime module and determining workload.

As can be seen from FIGS. 4(a) and 4(b), when a runtime module is not applied, it can be seen that the utilization of a GPU 400 and a multicore CPU 402 is maintained at a predetermined level for the entire measurement time period, so energy consumption 404 is also maintained at a predetermined level for the entire measurement time period.

On the contrary, when the runtime module of the present disclosure is applied, as can be seen from FIG. 4(c), it can be seen that the utilization of the GPU 410 and the multicore CPU 412 approaches 0 before the end of the measurement time period. That is, it can be seen from FIG. 4(c) that the operation time of the processing device reduces half in comparison to that in FIG. 4(a). This means a two-time improvement in the operation speed. Further, it can be seen from FIG. 4(d) that energy consumption 412 rapidly reduces in comparison to energy consumption in FIG. 4(b).

Accordingly, applying the runtime module of the present disclosure provides an effect of improving the operation speed and reducing the energy consumption (power consumption) of an application.

Figures 5, 6:
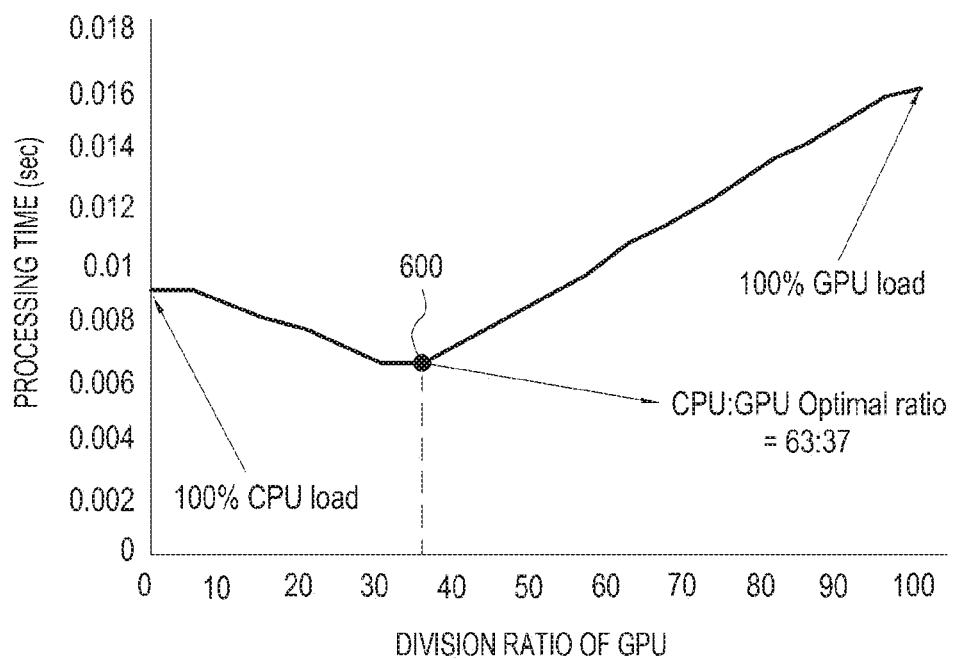
FIG. 5 is a table comparing processing times of processing devices according to an input size of a cache in a technique according to the present disclosure.
FIG. 6 is a view exemplifying performance (processing time) according to a load division ratio when a CPU and a GPU are used in the technique according to the present disclosure.

FIG. 5 is a table comparing processing times of processing devices according to an input size of a cache in a technique according to the present disclosure.

Referring to FIG. 5, it can be seen the calculation time 500 of a Serial mode (that is, a single core CPU) is the smallest when the input size of a cache is 30K, and the calculation time 502 of a Parallel-SIMD mode (that is, a SIMD and a CPU) is the smallest when the input size is 3000K. Accordingly, the runtime module may select a processing device in consideration of performance information depending on a cache input size.

FIG. 6 is a view exemplifying performance (processing time) according to a load division ratio when a CPU and a GPU are used in the technique according to the present disclosure.

Referring to FIG. 6, it can be seen that when load is divided at a ratio of about 63:37, the CPU and the GPU show a minimum processing time.

Figure 7:
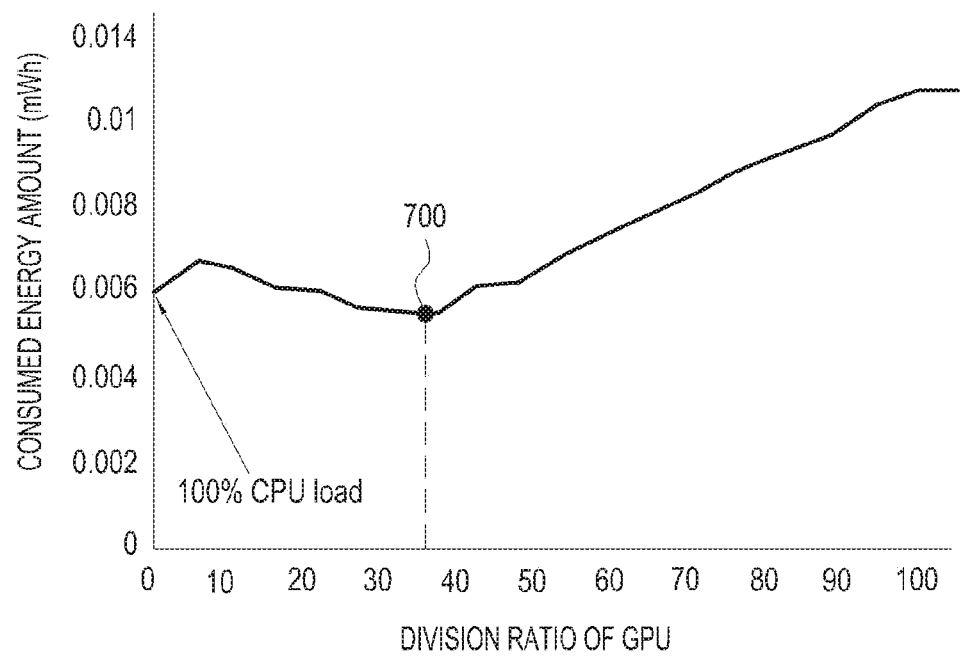
FIG. 7 is a view exemplifying energy consumption amount according to workload when a CPU and a GPU are used in the technique according to the present disclosure.

FIG. 7 is a view exemplifying energy consumption amount according to workload when a CPU and a GPU are used in the technique according to the present disclosure.

Referring to FIG. 7, it can be seen that when load is divided at a ratio of about 65:35, the CPU and the GPU consume minimum energy.

Figure 8:
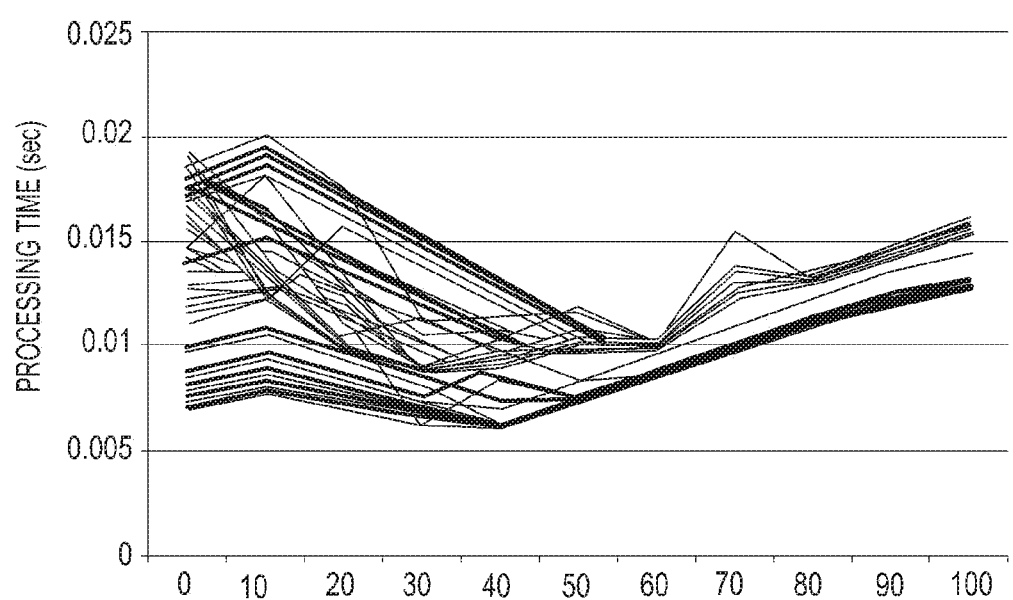
FIG. 8 is a view exemplifying performance (processing time) according to workload and utilization when a CPU and a GPU are used in the technique according to the present disclosure.

FIG. 8 is a view exemplifying performance (processing time) according to workload and utilization when a CPU and a GPU are used in the technique according to the present disclosure.

In FIG. 8, the closer to 0 the utilization β, the more the graphs are moved down. Referring to FIG. 8, it can be seen the processing time shows various results, depending on the utilization and load division rate.

Figure 9:
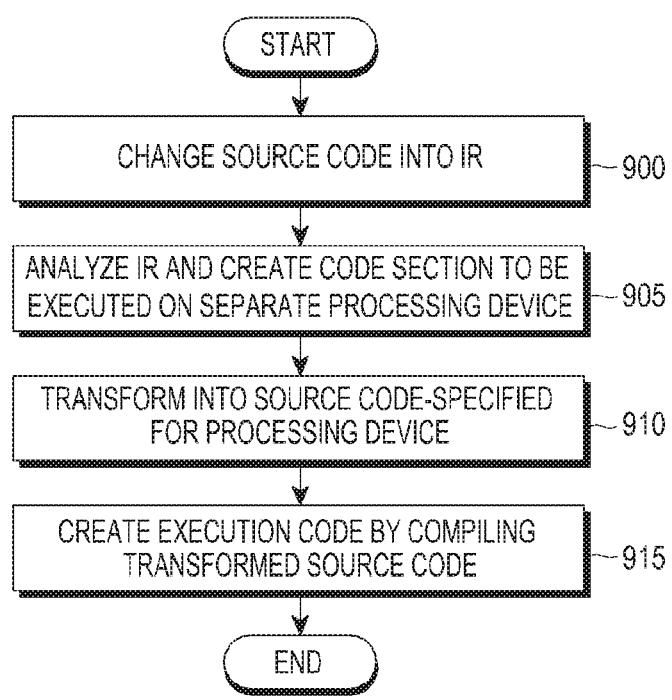
FIG. 9 is a view schematically illustrating the operation of a complier module according to the present disclosure.

FIG. 9 is a view schematically illustrating the operation of a complier module according to the present disclosure.

The operation shown in FIG. 9, which is an operation that can be performed before the runtime module described with reference to FIG. 3 is operated, can be performed in a compiler module in a device (for example, a terminal) that is the same as the runtime module or another device (for example, a server or a desktop).

The compiler module changes an application source code into an intermediate code (that is, IR) that a compiler can understand (900).

The compiler module analyzes a dependence relationship included in the IR and creates code sections that can be respectively executed by processing devices from the IR (905).

The compiler module transforms the code sections into source codes specified for (suitable for) the processing devices (910). The compiler module may further perform an operation of extracting code information from the code sections. Further, code characteristics to be used by the runtime module performing execution codes may be included in the type of a data structure in the transformed source codes.

The compiler module can create execution codes suitable for the processing devices by compiling the transformed source codes (915).

The compiler module enables the runtime module to execute the execution codes on the processing devices by providing the created execution codes to the runtime module.

Table 7 shows the analysis performance of a compiler according to the present disclosure.

TABLE 7

| Program | Related art | | Present disclosure | |
|---|---|---|---|---|
| | Analysis time (sec.) | Total node | Analysis time (sec.) | Combined nodes |
| AccumulateWeighted In OpenCL | 40.1 | 79,001 | 4.7 | 34679 (44332 nodes combined) |

Referring to Table 7, it can be seen that when the analysis technique of the present disclosure is applied, the analysis time reduces to 4.7 seconds from 40.1 seconds of the existing analysis technique and the number of analyzed nodes reduces to 36,479 from 79,001 of the existing analysis technique. An accumulated weighted algorithm was used for the test in Table 7.

It should be noted that the apparatus configuration diagrams, the method illustration flowcharts, and the performance illustration views illustrated in FIGS. 1 to 9 are not intended to limit the scope of protection of the present disclosure. That is, it should not be construed that all component parts or operations shown in FIGS. 1 and 9 are essential component elements for implementing the present disclosure, and it should be understood that only a few component elements may implement the present disclosure within a scope without departing the subject matter of the present disclosure.

The above described operations may be implemented by providing a memory device storing a corresponding program code to the entity of the communication system, the function, the base station, the load manager, or a specific structural element of the terminal. That is, the entity, the function, the load manager, or the controller of the terminal carries out the above described operations by reading and executing the program code stored in the memory device by means of a processor or a CPU.

The entity, the function, the base station, the load manager, various structural elements of the terminal, modules and the like may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit (ASIC).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method of executing an application using at least one processing device in a terminal, the method comprising:
    calculating a processing time of the at least one processing device included in the terminal;
    selecting a predetermined number of processing devices to execute the application based on the calculated processing time of the at least one processing device;
    determining workload minimizing a processing time function determined using utilization corresponding to the selected predetermined number of processing devices; and
    executing the application by applying the determined workload to the predetermined number of processing devices.

2. The method of claim 1, further comprising:
    changing a source code of the application into an intermediate representation (IR);
    analyzing the IR and creating at least one code section that can be executed on a specific processing device from the IR;
    transforming the at least one code section into source codes specified for the processing devices; and
    creating execution codes specified for the processing devices by compiling the transformed source codes.

3. The method of claim 2, wherein creating at least one code section that can be executed on a specific processing device from the IR includes:
    analyzing a dependence relationship included in the IR; and
    creating a code section including nodes not related to the dependence relationship in the IR as the code sections that can be executed on the specific processing device.

4. The method of claim 3, wherein at least two nodes having a cycle relationship are handled as one node when the dependence relationship is analyzed.

5. The method of claim 3, wherein when the dependence relationship is analyzed, a first node not added with a predecessor in online analysis and a second node that is one predecessor node that the first node has in offline analysis are combined into one node, and
    wherein all pointers of the first node come from only the second node.

6. The method of claim 2, further comprising extracting code information from the created code section,
    wherein the code information includes at least one of information related to instructions in the code section and information of a cache transmission data amount.

7. The method of claim 2, wherein the transformed source code includes a data structure corresponding to a code characteristic, and
    wherein the code characteristics includes at least one of simultaneous use or not, an execution code to be executed, the number of threads, and data range information of each execution code.

8. The method of claim 2, wherein the source code of the application is one source code constructed by C or C++ language.

9. The method of claim 1, wherein the at least one processing device includes at least two of a single core central processing unit (CPU), single instruction multiple data (SIMD), Parallel-SIMD, a graphic processing unit (GPU), a general purpose GPU (GPGPU), and a digital signal processor (DSP).

10. The method of claim 1, further comprising selecting the predetermined number of processing devices based on a user preference, wherein the user preference is input by a compiler directive.

11. A terminal including a runtime module that executes an application using at least one processing device, wherein the runtime module includes:
    a scheduler that calculates a processing time of the at least one processing device included in the terminal, selects a predetermined number of processing devices to execute the application bakd on the calculated processing time of the at least one processing device, determines workload minimizing a processing time function determined using utilization corresponding to the selected predetermined number of processing devices, and executes the application by applying the determined workload to the predetermined number of processing devices; and
    a device monitor that calculates the utilization information.

12. The terminal of claim 11, further comprising a compiler module that changes a source code of the application into an IR (Intermediate Representation), creates at least one code section that can be executed on a specific processing device from the IR by analyzing the IR, transforms the at least one code section into source codes specified for the processing devices, and creates execution codes specified for the processing devices by compiling the transformed source codes.

13. The terminal of claim 12, wherein the compiler module creates a code section including nodes not related to a dependence relationship in the IR as the code sections that can be executed on the specific processing device by analyzing the dependence relationship included in the IR.

14. The terminal of claim 13, wherein the compiler module handles at least two nodes having a cycle relationship as one node when analyzing the dependence relationship.

15. The terminal of claim 13, wherein when the dependence relationship is analyzed, a first node not added with a predecessor in online analysis and a second node that is one predecessor node that the first node has in offline analysis are combined into one node, and wherein all pointers of the first node come from only the second node.

16. The terminal of claim 12, wherein the compiler module extracts code information from the created code section, wherein the code information includes at least one of information related to instructions in the code section and information of a cache transmission data amount.

17. The terminal of claim 12, wherein the transformed source code includes a data structure corresponding to a code characteristic, and wherein the code characteristics includes at least one of simultaneous use or not, an execution code to be executed, the number of threads, and data range information of each execution code.

18. The terminal of claim 12, wherein the source code of the application is one source code constructed by C or C++ language.

19. The terminal of claim 11, wherein the at least one processing device includes at least two of a single core central processing unit (CPU), single instruction multiple data (SIMD), Parallel-SIMD, a graphic processing unit (GPU), a general purpose GPU (GPGPU), and a digital signal processor (DSP).

20. The terminal of claim 11, wherein the scheduler further selects the predetermined number of processing devices based on a user preference inputted by a compiler directive.

\* \* \* \* \*